United States Patent [19]
Dandl

[11] Patent Number: 6,024,578
[45] Date of Patent: Feb. 15, 2000

[54] LEARNING PLAY CARD

[76] Inventor: Friedrich Dandl, Entenbachstr. 16, 81541 Muenchen, Germany

[21] Appl. No.: 09/141,412

[22] Filed: Aug. 27, 1998

[30]   Foreign Application Priority Data

Aug. 27, 1997 [DE]  Germany ................. 297 15 399 U

[51] Int. Cl.⁷ .................................................... G09B 3/00
[52] U.S. Cl. .......................................... 434/347; 434/327
[58] Field of Search .............................. 434/81, 129, 188, 434/258, 259, 333, 327, 334, 347, 407; 273/296, 302, 308

[56]            References Cited

U.S. PATENT DOCUMENTS

| | | |
|---|---|---|
| 1,033,576 | 7/1912 | Garman . |
| 2,138,524 | 11/1938 | Harkins .................................. 434/327 |
| 3,283,417 | 11/1966 | Lohmar .................................. 434/327 |
| 3,387,391 | 6/1968 | Bartolo .................................. 434/209 |
| 3,456,364 | 7/1969 | Alexander ............................. 434/209 |
| 3,604,127 | 9/1971 | Howatt .................................. 434/327 |
| 3,928,922 | 12/1975 | Rosenbaum ........................... 434/347 |
| 5,031,935 | 7/1991 | D'Andrea ................................ 281/15 |
| 5,634,799 | 6/1997 | Opperman et al. ..................... 434/345 |
| 5,759,041 | 6/1998 | Batten .................................... 434/209 |

FOREIGN PATENT DOCUMENTS

| | | |
|---|---|---|
| 8321685 | 2/1984 | Germany . |
| 8801556 | 5/1988 | Germany . |
| 9014310 | 3/1991 | Germany . |
| 29605238U1 | 7/1996 | Germany . |
| 603611 | 6/1948 | United Kingdom .................. 434/347 |

*Primary Examiner*—Robert A. Hafer
*Assistant Examiner*—Kurt Fernstrom
*Attorney, Agent, or Firm*—Fitzpatrick, Cella, Harper & Scinto

[57]            ABSTRACT

The invention provides a card for learning purposes, which has at least two holes 7, 8 of essentially the same size. At least three separate sections 9, 10, 11 are printed on the front side 1 of the card. In each case one section 9, 10 is assigned to one of the holes 7, 8. The card also has a rear side 6, which has a picture 5 or graphics printed on it, the picture 5 or the graphics on the rear side 6 of the card being arranged such that at least one of the holes 7, 8 is not an integrated constituent part of the picture 5 or of the graphics on the rear side 6 of the card.

15 Claims, 4 Drawing Sheets

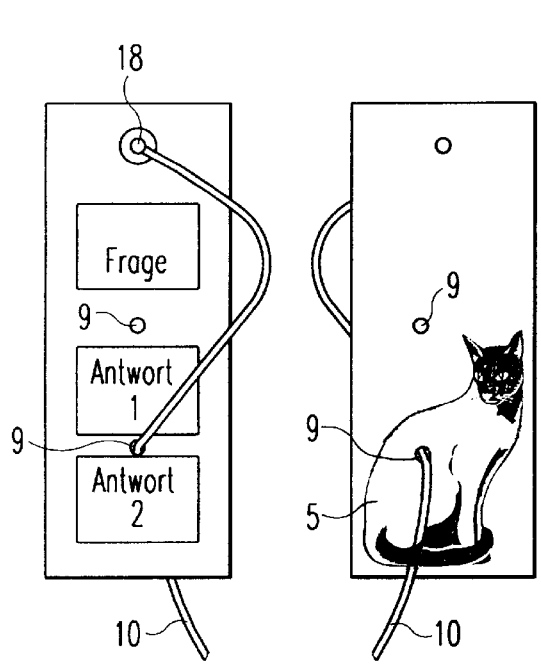
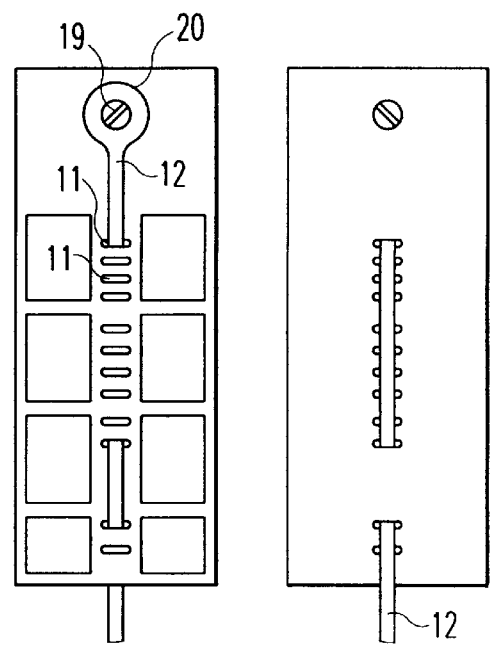
Fig. 5
Fig. 6
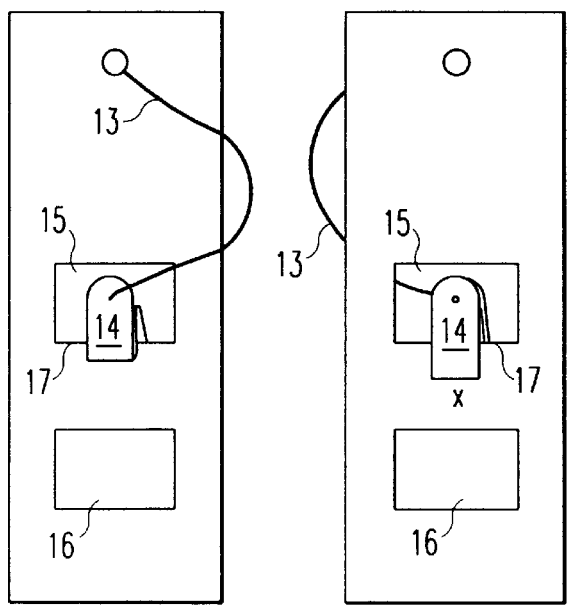
Fig. 7

LEARNING PLAY CARD

BACKGROUND OF THE INVENTION

1. Field of the Invention

The present invention relates to a card which can be used for learning purposes.

2. Description of the Related Art

It is known from the prior art to print a picture on the front side and rear side of play cards and to provide this play card with a hole. This hole is arranged and dimensioned such that, when the player pushes a finger or a pen through this hole of the play card from the front side of the latter, the finger or pen which protrudes on the rear side of the play card finishes off the picture on the rear side of the play card in an amusing way. For example, that part of the finger or of the pen which protrudes on the rear side of the card may constitute a three-dimensional embodiment of the nose of a face, if this face is the picture provided on the rear side of the play card.

However, a play card of this type is purely for entertainment purposes and is of no value to the player as far as learning is concerned.

SUMMARY OF THE INVENTION

The object of the present invention is to design a play card of the abovementioned type such that, with the effect of a learning play card, the player can also learn from it.

The idea which is central to the invention is to provide the learning play card with at least two holes.

For this purpose, the present invention provides a card for learning purposes, which has two holes of essentially the same size. A front side of the card has at least three separate sections printed on it. In each case one section is assigned to one of the holes. The rear side of the card has a picture or graphics printed on it. The picture or the graphics on the rear side of the card are arranged such that at least one of the holes is not an integrated constituent part of the picture or of the graphics on the rear side of the card.

In order to be able to push a finger or a pen through easily, the holes may have, for example, a diameter of between approximately 0.5 cm and approximately 2.0 cm.

A cord or a ribbon may be fastened on the card, the holes being dimensioned such that the cord or the ribbon can be threaded through. The ribbon may be punched, for example, from a plastic sheet and the holes may be essentially in the form of slits.

The holes may be of rectangular form.

Clip elements which can be clipped firmly on the edges of the holes may be provided, holes of rectangular form being advantageous in the case of the clip elements. The clip elements may be fastened on the card by means of a cord, for example, to prevent them from going missing.

One of the sections printed on the front side may be a task-setting section, which sets the player a task, for example, using a mixture of textual and pictorial elements.

It is also possible for a plurality of holes to form a visually integrated constituent part of the picture or of the graphics on the rear side of the card.

The card may be made of a cardboard material. The card may be of rectangular design. In this case, the holes are arranged such that a line connecting the holes is essentially parallel to one of the edges of the card.

It is possible for just a single coherent illustration to be printed on the rear side of the card, it always being the case that at least one hole is not a constituent part of this illustration.

The invention also provides an arrangement for learning purposes. This arrangement has a plurality of cards connected in the manner of a fan and also has a cord which is fastened on the cards, the holes being dimensioned such that the cord can be threaded through the holes. According to the invention, the cord constitutes, at the same time, the binding for the plurality of cards.

The present invention thus provides a learning play card which has a front side, on which at least three visually separate sections are printed. One section, in this case, constitutes a task-setting section. At least two sections constitute suggested-solution sections. The rear side of the learning play card is provided with a picture. The learning play card has at least two holes, at least one hole being assigned to one of the suggested-solution sections in each case. The holes each have an identical diameter in a range between approximately 0.5 cm and 2.0 cm. The picture on the rear side is arranged and/or designed such that at least one of the holes is not a visually integrated constituent part of the picture on the rear side. It is thus possible for the picture on the rear side to be finished off by one or more fingers or pens being pushed into the hole which is assigned to the correct solution or being pushed into the correct combination of holes. The task-setting section and/or the suggested-solution sections on the front side of the learning play card may have pictures. The task-setting section and/or the suggested-solution sections on the front side may have a text. Of course, the task-setting section and/or the suggested-solution sections may have a mixture of pictures and text.

BRIEF DESCRIPTION OF THE DRAWINGS

The invention will now be explained in more detail, by way of exemplary embodiments, with reference to the attached figures, in which:

FIG. 5 shows a front and rear view of a further exemplary embodiment of the invention, in which a cord is fastened on the card, FIG. 6 shows a front and rear view of a further exemplary embodiment of the invention, in which a plastic ribbon is fastened on the card, FIG. 7 shows a front and rear view of a further exemplary embodiment of the invention, in which clip elements are fastened on the card.

DETAILED DESCRIPTION OF THE PREFERRED EMBODIMENTS

Figure 1:
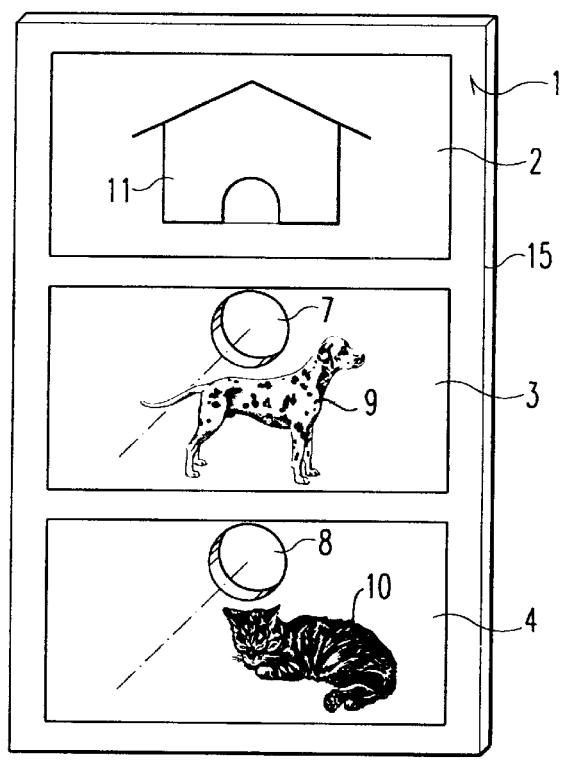
FIG. 1 shows a front view of a card according to the invention which can be used for learning purposes.

As can be seen in FIG. 1, a learning play card according to the invention essentially comprises a cut-to-size sheet which is made of a cardboard or plastic material, is printed on both sides and has two holes 7, 8. The sheet may also be made of a plastic-coated cardboard material. The dimensions of the learning play card according to the invention may be, for example, in a range between 4.0 and 10.0 cm widthwise and in a range between 5.0 and 20.0 cm lengthwise. As can be seen in FIG. 1, the front side of a learning play card according to the invention is subdivided, in the example illustrated, into three visually separate sections which are printed on the front side of the learning play card. One section 2, in this case, constitutes a task-setting section and, in the example illustrated in FIG. 1, has a picture 11, namely a kennel, printed on it. The other two sections 3, 4, which are visually separate from the task-setting section 2 and from one another, constitute suggested-solution sections. In the exemplary embodiment illustrated in FIG. 1, the two suggested-solution sections 3, 4 are also provided with a picture 9 or 10, respectively. The picture 9 of the suggested-solution section 3 depicts a dog, while the picture 10 of the suggested-solution section 4 depicts a cat.

Each of the suggested-solution sections 3, 4 is assigned a hole 7 or 8, respectively, which penetrates the learning play card. In this case, the diameter of the holes 7, 8 is dimensioned such that a human finger or a pen can be pushed through. The diameter is thus preferably in a range between 0.5 cm and 2.0 cm.

As has already been mentioned, the picture 11, namely the kennel, has a task-setting function. In the example illustrated, the player has to select, as the solution, which of the pictures 9 and 10, illustrated in the suggested-solution sections 3 and 4, respectively, depicts an animal which usually sleeps in the kennel 11. If the player thinks that the dog, which is depicted as picture 9, is the solution, he pushes a finger or a pen through the hole which is assigned to the suggested-solution section 3 or 4 which the player thinks has the correct solution printed on it. In the present example, the player, if correct, will push a finger or a pen or the like through the hole 7.

Figures 3, 4:
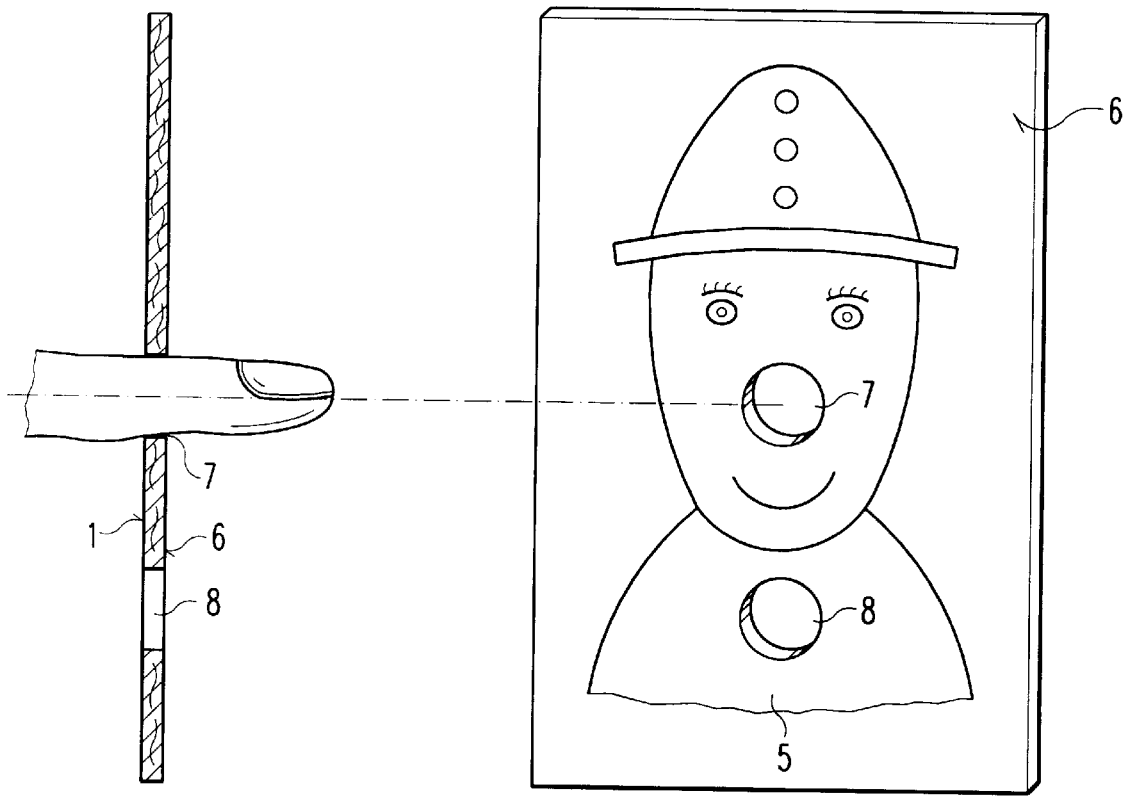
FIG. 3 shows a sectional side view of a learning play card according to the invention with a finger pushed through one hole.
FIG. 4 shows a rear view of a learning play card according to the invention.

This results in the situation illustrated in FIG. 3. FIG. 3 illustrates the situation where a player has pushed a finger through the hole 7, from the front side 1 of the play card, and part of the finger thus protrudes on the rear side 6 of the learning play card according to the invention.

In order to explain the effect of the pen or finger which protrudes on the rear side 5 of the learning play card, it will now be explained, with reference to FIG. 4, how the rear side 5 of the learning play card of the invention is designed.

As can be seen in FIG. 4, the rear side 5 of the learning play card according to the invention has a picture 5 printed on it. Alternatively, it is also possible for the rear side to have graphics printed on it. The picture 5 on the rear side 6 of the learning play card according to the invention is designed and arranged such that one of the holes 7, 8 of the learning play card is a visually integrated constituent part of the picture 5. By contrast, the other hole, the hole 8 in the illustrated example of FIG. 4, is not a visually integrated constituent part of the picture 5 on the rear side 6 of the learning play card according to the invention; it thus has no visual function for the picture 5 on the rear side 6 of the learning play card according to the invention. In the context of the present description, "visually integrated constituent part of the picture" is intended to mean that wherever the hole which constitutes the correct solution for the set task in the object-setting section 2 on the front side 1 of the learning play card according to the invention is arranged, the corresponding hole fits into the picture 5 with the effect that, at the position of the hole, an object which is approximately circular in a top view forms a coherent part of the picture 5. For the case where graphics are printed on the rear side, the hole assigned to the correct solution finishes off the graphics.

A particularly good effect is achieved if the protruding part on the rear side 6 of the learning play card according to the invention constitutes the three-dimensional embodiment of that part of the picture which is provided at this point. In the example illustrated in FIG. 4, the picture 5 is a face of a clown or the like, the finger or pen which has been pushed through the hole 7 constituting the three-dimensional embodiment of the nose of the clown's face. By contrast, however, the other hole 8, which on the front side 1 of the learning play card according to the invention is assigned to a picture 10 which constitutes an incorrect solution to the task on the task-setting section 2 on the front side 1 of the learning play card according to the invention, is, as can be seen in FIG. 4, arranged in relation to the picture 5 on the rear side 6 of the learning play card according to the invention such that it does not form a coherent part of the picture 5, and is thus not a visually integrated constituent part of the picture 5 on the rear side 6 of the learning play card according to the invention.

Figure 2:
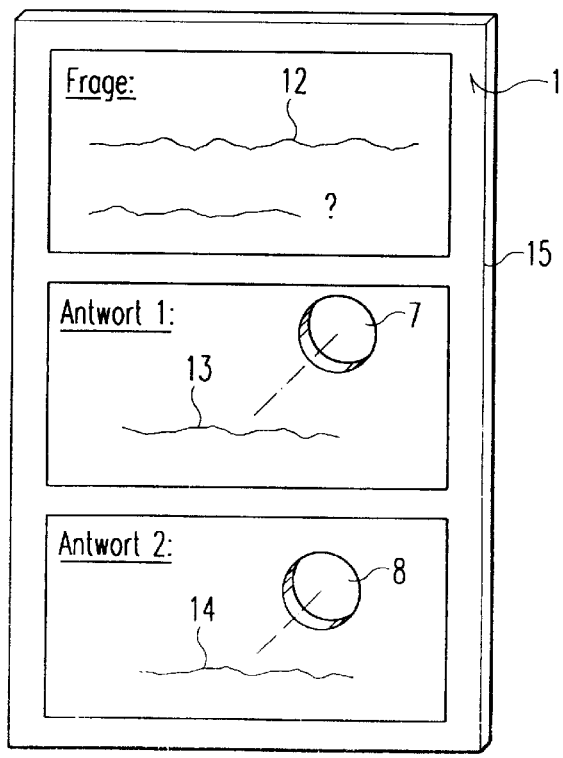
FIG. 2 shows a front view of a further exemplary embodiment of a learning play card according to the invention.

As can be seen in FIG. 2, the set task or question and the suggested answers in the suggested-solution sections 3 and 4 may also be provided in the form of a text 12, 13, 14. Of course, it is also possible for a set question and the suggested solutions given to contain a mixture of pictures and text.

The provision of a plurality of holes in the learning play card according to the invention, 2 holes in the example illustrated, can result in the player learning therefrom in that only one of the holes is assigned to a correct suggested solution and, at the same time, the picture 5 on the rear side 6 of the learning play card according to the invention is arranged and designed such that only the hole which is assigned to the correct suggested solution is a visually integrated constituent part, with the effect of forming a coherent part of the picture 5 from a visual point of view.

In the case of the above exemplary embodiment, just one hole forms a visually integrated constituent part of the picture on the rear side of the learning play card. Of course, it is also possible for a plurality of holes to form a visually integrated constituent part of the picture on the rear side, provided that there is only one hole which, in terms of an incorrect solution, does not form a coherent part of the picture on the rear side from a visual point of view. In this case, the correct solution thus comprises the correct combination of holes through which, for example, a finger, a pen or the like has to be pushed. For example, the act of pushing four fingers into the holes which constitute the correct solution can finish off a picture of a four-legged animal such that the fingers which protrude on the rear side finish off, or form, the legs of the animal.

It can easily be seen, in particular, from FIGS. 1, 2 and the sectional view of FIG. 3 that the holes 7, 8 in the card have essentially the same diameter. As can be seen from the sectional view of FIG. 3 and the views according to FIGS. 1 and 2, the holes 7, 8 in the card are arranged such that an imaginary line connecting the centre points of all the holes 7, 8 runs approximately parallel to one edge, in the exemplary embodiment illustrated the longitudinal edge 15 of the card.

As regards the printing 5 on the rear side, as is illustrated in FIG. 4, it should be noted that, according to this exemplary embodiment, just a single illustration is printed on the rear side 6 of the card.

As can be seen in FIG. 1, the solution picture sections 9, 10 are assigned to their respective holes 7, 8 such that they are printed on in close spatial proximity to these holes 7 and 8.

Further exemplary embodiments of the invention will now be explained with reference to FIGS. 5 to 7.

In the exemplary embodiment according to FIG. 5, a cord 10 is connected firmly to the card. The cord may be arranged firmly on the card, for example, in the region of a binding 18 if a plurality of cards are to be bound one above the other in the manner of a fan. In this case, the cord 10 itself may constitute the binding 18 by being routed through all the cards. The holes 9 according to this exemplary embodiment are dimensioned such that the cord 10 can easily be threaded through. In other words, in this case the holes 9 are usually produced with a smaller diameter than for the case where, as in the exemplary embodiments according to FIGS. 1 to 4, fingers or pens are to be pushed through the holes.

The exemplary embodiment of FIG. 6 constitutes a modification to the exemplary embodiment of FIG. 5 to the effect that the cord 10 according to the exemplary embodiment of FIG. 5 has essentially been replaced by a flat ribbon 12, which is made, for example, of a plastic material. In particular, the plastic ribbon 12 may be punched from a flat plastic sheet. At the end at which it is fastened on the card, the plastic ribbon 12 may have an eyelet 20 which is screwed on the card by means of a binding screw 19 and, for example, may also, at the same time, constitute a binding for a stack of cards. In this case, of course, the holes 12 in the card are designed in the form of slits, to correspond to the flat-ribbon form. In relation to the cord 10, the plastic ribbon 12 has the advantage that it exhibits less friction in the holes 11 and the plastic ribbon 12 can thus more easily be drawn out of all the threading holes 11 in one movement.

FIG. 7 illustrates a further exemplary embodiment of the present invention, which is characterized essentially by clip elements 14. These clip elements 14, which are fastened on the card 1 by means of a cord 13 similar to the cord 10 in FIG. 5, are in this case slipped on the edge 17 of rectangular holes 15, 16, in order thus to select an associated suggested solution.

Figure 8:
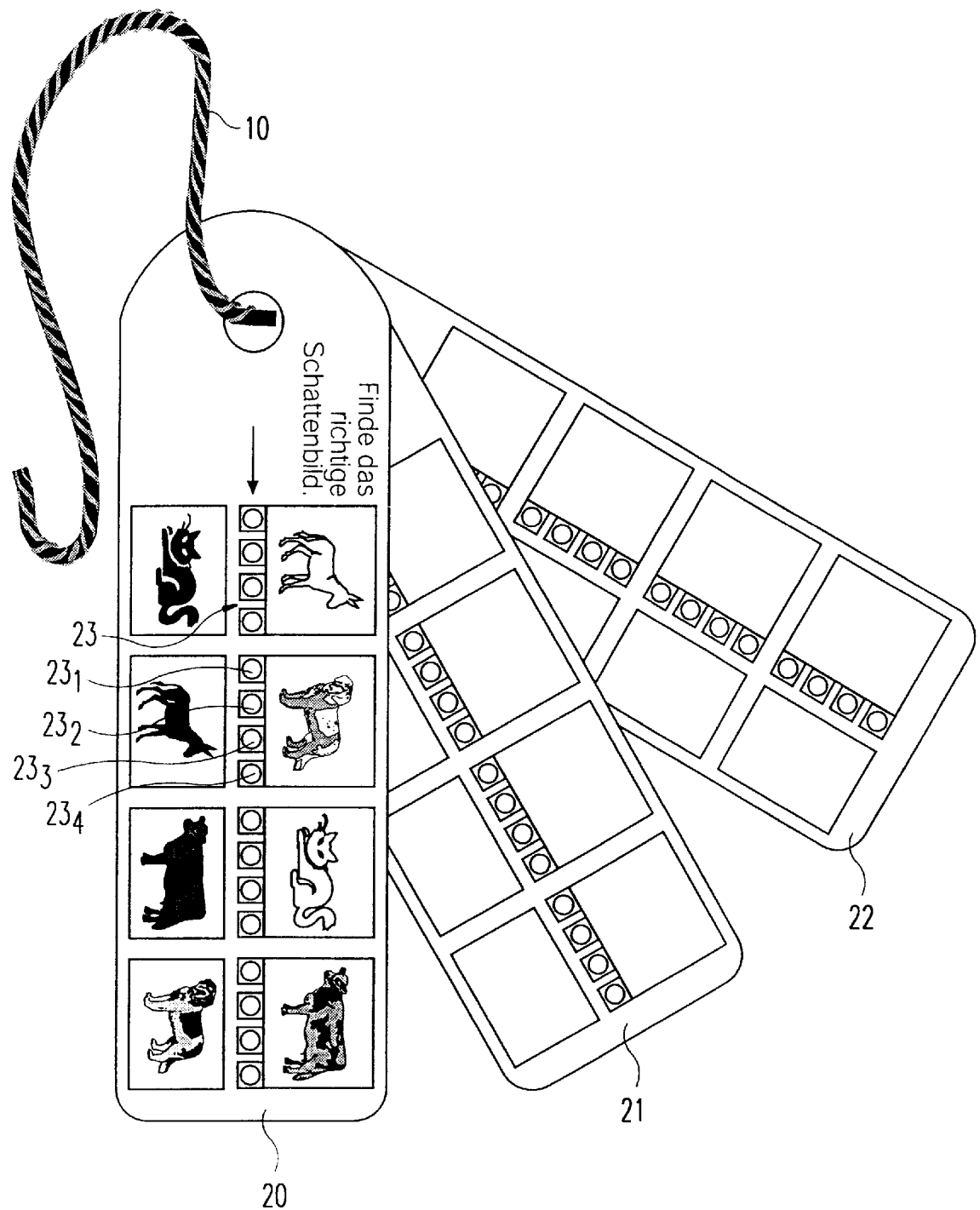
FIG. 8 shows a further exemplary embodiment of the invention, in which a cord can be threaded through holes and a plurality of cards are bound in the manner of a fan.

FIG. 8 illustrates yet another exemplary embodiment of the present invention, which has fundamental elements of the exemplary embodiment which has been explained with reference to FIG. 5. In other words, an arrangement 23 of holes $23_1$, $23_2$, $23_3$, $23_4$ is provided on the front side of the card for each set question. Furthermore, a cord 10 is connected firmly to the cards according to FIG. 8. Once again, it is thus necessary, to provide the solution for the set question printed on the front side, for the cord to be threaded through that particular hole contained in the group of holes $23_1$, $23_2$, $23_3$, $23_4$ which the player thinks is the correct solution.

Furthermore, it is fundamental to the exemplary embodiment according to FIG. 8 that a plurality of cards 20, 21, 22 are connected firmly to one another, with the result that they can be spread out in the manner of a fan. In this case, they may likewise be bound by the cord 10 which, in this case, thus passes through coinciding holes in each of the cards 20, 21, 22 and, for example, is tied such that the cards are connected such that they can be spread out. Of course, it is also possible for the cards according to the other exemplary embodiments, illustrated in FIGS. 1 to 7, to be bound one above the other in stack form, for example, by a bookbinding, a binding screw or the like, this resulting in an arrangement of learning play cards which the player can spread out in the manner of a book or fan in order to select and use a given card contained in the plurality of cards.

I claim:

1. In a card for learning purposes, the combination of:

at least three separate regions with associated graphic illustrations printed one side of said card;

said illustrations including a first illustration in a first of said regions with which only the illustration in one of the other of said regions is properly associated;

holes extending through said card in each of the other regions; and a further illustration on the opposite side of said card, said further illustration being configured such that when an object is inserted through the hole in said one of said other regions from said one side of the card, the object properly completes the further illustration on the opposite side of the card, but when an object is inserted through another hole, it distorts the further illustration.

2. Card according to claim 1, wherein the holes have a diameter of between 0.5 cm and 2 cm.

3. Card according to claim 1, further including a cord or a ribbon which is fastened on the card, and wherein the holes are dimensioned such that the cord or the ribbon can be threaded through.

4. Card according to claim 3, wherein the ribbon is punched from a plastic sheet and the holes are essentially in the form of slits.

5. Card according to one of claims 1 to 4, wherein the holes are of rectangular form.

6. Card according to claim 1, further including clip elements which are clipped firmly on the edges of the holes.

7. Card according to claim 6, wherein the clip elements are fastened on the card by means of a cord.

8. Card according to claim 1, wherein only a single coherent illustration is printed on the rear side of the card, at least one of the holes in the card not being an integrated constituent part of the coherent illustration.

9. Card according to claim 1, wherein in each case one section of the card is assigned to one of the holes by way of the spatial proximity of the respective section to the corresponding hole.

10. Card according to claim 1, wherein one of the sections printed on the front side is a task-setting section.

11. Card according to claim 10, wherein the task-setting section has textual and pictorial elements.

12. Card according to claim 1, wherein a plurality of holes form a visually integrated constituent part of the picture or of the graphics on the rear side of the card.

13. Card according to claim 1, wherein the card is made of a cardboard material.

14. Card according to claim 1, wherein that the card is rectangular.

15. Card according to claim 1, wherein the holes are arranged such that a line connecting their centers is essentially parallel to one of the edges of the card.

* * * * *